(12) United States Patent
Walstrom et al.

(10) Patent No.: US 11,798,142 B2
(45) Date of Patent: Oct. 24, 2023

(54) GATEWAY DEVICE FOR VOLUMETRIC SENSING

(71) Applicant: XIRGO TECHNOLOGIES, LLC, Camarillo, CA (US)

(72) Inventors: Brian Joseph Walstrom, Plymouth, MN (US); John Lee Ponti, Camarillo, CA (US); Savanna Liah Steinmetz, South St. Paul, MN (US); Timothy Allen Nelson, St. Louis Park, MN (US)

(73) Assignee: XIRGO TECHNOLOGIES, LLC, Camarillo, CA (US)

( * ) Notice: Subject to any disclaimer, the term of this patent is extended or adjusted under 35 U.S.C. 154(b) by 52 days.

(21) Appl. No.: 17/517,872

(22) Filed: Nov. 3, 2021

(65) Prior Publication Data

US 2022/0318963 A1    Oct. 6, 2022

Related U.S. Application Data

(63) Continuation of application No. 17/227,064, filed on Apr. 9, 2021, now Pat. No. 11,195,260, which is a
(Continued)

(51) Int. Cl.
*G06T 5/00* (2006.01)
*H04N 13/239* (2018.01)
(Continued)

(52) U.S. Cl.
CPC .............. *G06T 5/009* (2013.01); *G06T 5/002* (2013.01); *G06T 5/50* (2013.01); *G06T 7/38* (2017.01);
(Continued)

(58) Field of Classification Search
CPC .......... G06T 5/009; G06T 5/002; G06T 5/50; G06T 7/38; G06T 7/593; G06T 2207/20221; G06T 2207/20208; G06T 2207/30268; G06T 5/008; G06T 2207/10012; G06T 15/08; G06V 20/10; G06V 10/30; G06V 10/74; G06V 10/764;
(Continued)

(56) References Cited

U.S. PATENT DOCUMENTS 10,302,478 B1 * 5/2019 Bennett ................... G01S 17/89
10,479,418 B1 * 11/2019 Patel .................. B65D 90/0066
(Continued)

*Primary Examiner* — Jose L Couso
(74) *Attorney, Agent, or Firm* — NIXON PEABODY LLP

(57) ABSTRACT

A system includes a sensor including a set of cameras configured to capture a set of images of an enclosed space. The system further includes a processor and a non-transitory computer-readable medium containing instructions which, when executed on the processor, cause the processor to perform operations including: (a) receiving the set of images captured by the set of cameras; (b) pre-processing the set of images to increase quality and reduce effect of ambient lighting; (c) building a disparity map for the set of images based at least in part on a relationship between the set of cameras; and (d) determining an occupancy of the enclosed space based at least in part on the disparity map. The system can be used to determine occupancy in a trailer with irregularly shaped cargo using low cost sensors.

20 Claims, 8 Drawing Sheets
(2 of 8 Drawing Sheet(s) Filed in Color)

Related U.S. Application Data continuation of application No. 17/220,910, filed on Apr. 1, 2021, now abandoned.

(51) Int. Cl.
  *G06T 5/50* (2006.01)
  *G06T 7/593* (2017.01)
  *G06T 7/38* (2017.01)
  *G06V 20/10* (2022.01)

(52) U.S. Cl.
  CPC .............. *G06T 7/593* (2017.01); *G06V 20/10* (2022.01); *H04N 13/239* (2018.05); *G06T 2207/20221* (2013.01)

(58) Field of Classification Search
  CPC .... G06V 20/52; G06V 10/245; H04N 13/239; H04N 13/128; H04N 13/271; H04N 13/246; G06Q 10/083; G06Q 10/0832; G06Q 10/0833; G06Q 10/087; G06Q 10/0838; G06Q 10/06395; G06Q 10/08; G06Q 50/28; G06Q 50/30; B60P 1/6247; B60P 3/007; B62D 33/042; G06K 9/00664; G06K 9/00771; G06K 9/40; G06K 9/6267; G06K 9/6268; B65G 2207/40; B65G 67/02; B65G 67/04; B65G 69/2882

See application file for complete search history.

(56) References Cited

U.S. PATENT DOCUMENTS

| | | | |
|---|---|---|---|
| 11,348,269 B1 * | 5/2022 | Ebrahimi Afrouzi ... | G01S 17/89 |
| 11,481,918 B1 * | 10/2022 | Ebrahimi Afrouzi .. | G06V 20/56 |
| 11,657,531 B1 * | 5/2023 | Ebrahimi Afrouzi .. | G06V 20/64 |
| | | | 382/284 |
| 2014/0009577 A1 * | 1/2014 | Wakabayashi ......... | G01C 3/085 |
| | | | 348/43 |
| 2015/0123973 A1 * | 5/2015 | Larsen .................... | G06T 15/04 |
| | | | 345/427 |
| 2016/0047646 A1 * | 2/2016 | Ochsendorf ........... | G01B 11/28 |
| | | | 348/148 |
| 2017/0104979 A1 * | 4/2017 | Shaw .................... | H04N 13/239 |
| 2018/0060774 A1 * | 3/2018 | Seaman ........... | G06Q 10/06311 |
| 2018/0060809 A1 * | 3/2018 | Seaman ................ | H04W 4/023 |
| 2018/0060810 A1 * | 3/2018 | Seaman ............. | G06Q 10/0833 |
| 2018/0060814 A1 * | 3/2018 | Seaman ............. | G06Q 10/0838 |
| 2018/0096289 A1 * | 4/2018 | Terwilliger .......... | G06Q 10/083 |
| 2018/0096293 A1 * | 4/2018 | Terwilliger ............. | H04W 4/70 |
| 2018/0144429 A1 * | 5/2018 | Kim .................... | G06Q 10/083 |
| 2019/0304164 A1 * | 10/2019 | Zhang .................. | G06T 3/0093 |
| 2020/0132530 A1 * | 4/2020 | Ayoub .................. | G06Q 10/08 |
| 2021/0082220 A1 * | 3/2021 | Boerger ............... | G06Q 10/083 |
| 2021/0127881 A1 * | 5/2021 | Estill .................. | G06Q 10/0836 |
| 2021/0192429 A1 * | 6/2021 | Bhat ...................... | G06N 20/20 |

* cited by examiner

GATEWAY DEVICE FOR VOLUMETRIC SENSING

CROSS REFERENCE TO RELATED APPLICATIONS

This application is a continuation of U.S. patent application Ser. No. 17/227,064, filed Apr. 9, 2021, now allowed, which is a continuation of U.S. patent application Ser. No. 17/220,910, filed Apr. 1, 2021, both of which are hereby incorporated by reference herein in their entireties.

TECHNICAL FIELD

The present invention relates generally to a gateway device, and more specifically, to a gateway device for determining volume in a cargo space.

BACKGROUND

Cargo shipping and transportation is one of the major lifelines for society and facilitates efficiently moving goods across long distances. For example, companies can fill cargo containers with products for transport using tractors, trains, ships, etc. In some instances, companies can share containers because a specific company may not have enough products to fill an entire shipping container or trailer. In order to keep costs down, a shipping container may be shared with another company so that the empty space in the container is utilized, rather than being kept empty. In another example, moving companies can store personal belongings of multiple individuals in cargo containers or tractor trailers. The space available for receiving products or personal belongings can vary due to size of unusual objects. For example, tables and chairs do not have a similar geometry to boxes, as such estimating available volume for receiving items can be a complex task involving complex electronic systems and algorithms. Furthermore, as a tractor trailer transports items, the items may move, further affecting perceived space in the tractor trailer. Thus, the present disclosure provides systems and methods for solving problems associated with determining volume in a cargo space for various shipping and/or storage conditions.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system includes: (a) a sensor including a set of cameras configured to capture a set of images of an enclosed space; (b) a processor; and (c) a non-transitory computer-readable medium containing instructions which, when executed on the processor, cause the processor to perform operations including: receiving the set of images captured by the set of cameras; pre-processing the set of images to increase quality and reduce effect of ambient lighting; building a disparity map for the set of images based at least in part on a relationship between the set of cameras; and determining an occupancy of the enclosed space based at least in part on the disparity map.

According to certain aspects of the present disclosure, a method includes: (a) receiving a set of images of an enclosed space captured by a set of cameras; (b) pre-processing the set of images to increase quality and reduce effect of ambient lighting; (c) building a disparity map for the set of images based at least in part on a relationship between the set of cameras; and (d) determining an occupancy of the enclosed space based at least in part on the disparity map.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The patent or application file contains at least one drawing executed in color. Copies of this patent or patent application publication with color drawings will be provided by the Office upon request and payment of the necessary fee.

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
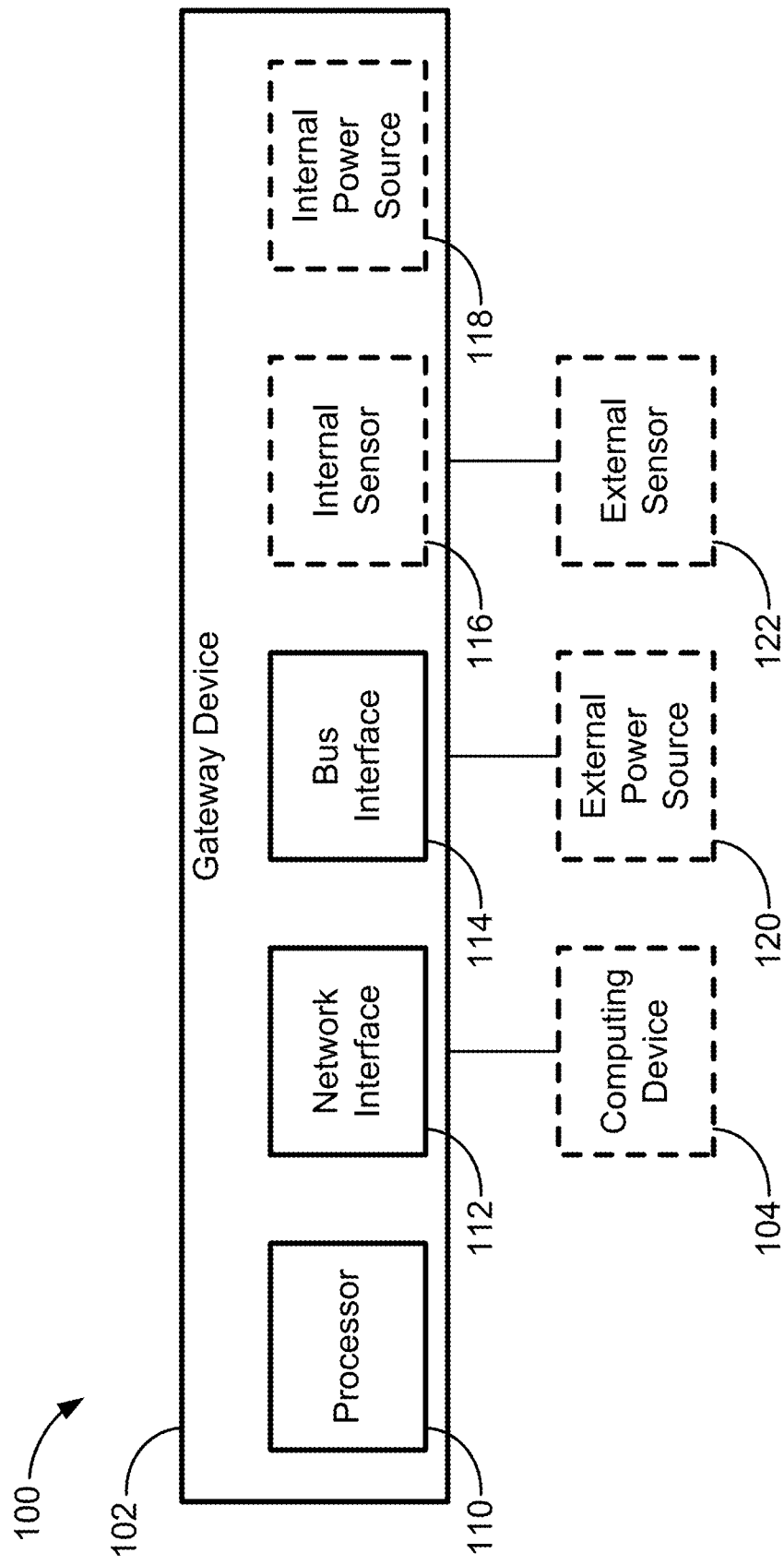
FIG. 1 is a system for volumetric sensing using a gateway device, according to certain aspects of the present disclosure.

Embodiments of the present disclosure provide a gateway device for determining volume in a cargo space. The gateway device is a cargo occupancy system that includes sensors for determining cargo occupancy under any lighting conditions. Traditional occupancy systems fail to provide accurate capacity and utilization information pertaining to cargo spaces. In an example, the gateway device can estimate cargo occupancy whether or not a door to a trailer is opened or closed. The gateway device can estimate cargo occupancy whether or not the door is a roll-up door or a swing style door.

Embodiments of the present disclosure provide a gateway device that can perform long-range depth mapping using low-cost, low energy hardware. Stereo camera systems typically require high quality, low-noise, and high contrast images. These requirements are more demanding than a typical low-cost image sensor can provide by itself. Embodiments of the present disclosure provide an image capture and pre-processing algorithm to create higher quality images than would otherwise be possible. As such, very high-quality images in difficult low lighting environments, like the inside of a trailer, can be produced using low-cost hardware. Low cost is important in some situations because high quality cameras and image sensors would be too expensive to outfit a fleet that includes hundreds or thousands of trailers.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5%" of a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a system 100 for volumetric sensing using a gateway device 102 is provided, according to certain aspects of the present disclosure. The system 100 includes the gateway device 102. The system 100 can also include a computing device 104, an external power source 120, and/or an external sensor 122. The computing device 104 can include at least one processor, memory, storage device, and/or network interface. The computing device 104 can be used to process data received from the gateway device 102, in some implementations. Examples of the computing device 104 can include a laptop computer, a desktop computer, a router, a smart phone, a tablet, a phablet, a personal digital assistant (PDA), etc. The external power source 120 can include an external battery supply (e.g., a car battery), a solar panel, an AC power source, etc.

The gateway device 102 includes a processor 110, a network interface 112, and a bus interface 114. The gateway device 102 can also include an internal sensor 116 and/or an internal power source 118. The processor 110 can be included as part of the network interface 112 in some implementations. The processor 110 can include some on-chip memory. The processor 110 can be a microprocessor or a microcontroller.

The network interface 112 facilitates communication between the gateway device 102 and the computing device 104. The network interface 112 can support mobile wireless broadband standards (e.g., long-term evolution (LTE), 5G, 4G, GSM, CDMA, etc.), global positioning systems (GPS), Bluetooth®, WiFi, etc.

The bus interface 114 can include a controller area network (CAN) bus, 1-wire bus, an inter-integrated circuit bus, or any combination thereof. The bus interface 114 facilitates connecting the gateway device 102 to a device ecosystem. For example, the gateway device 102 can be connected to a car or truck system, allowing the gateway device 102 to communicate with other devices in the car or truck. For example, if the engine of the truck is operating, then the gateway device 102 can receive, via the bus interface 114, a signal indicating that the gateway device 102 can reliably obtain power from a battery of the truck without draining the battery. In some implementations, the bus interface 114 facilitates connecting the external sensor 122 to the gateway device 102. For example, a door sensor of the truck can be coupled to the gateway device 102, and the gateway device 102 can use signals from the door sensor to trigger when to collect data for volumetric sensing.

The internal sensor 116 allows the gateway device 102 to collect data for volumetric sensing. The external sensor 122 is provided in some implementations. The internal sensor 116 and the external sensor 122 can be different merely by their location with respect to a housing of the gateway device 102. External sensor 122 are external to the housing of the gateway device 102 and internal sensor 116 are housed within the housing of the gateway device 102. The internal sensor 116 can include one or more image sensors (e.g., one or more cameras), a time of flight sensor (e.g., an ultrasonic sensor), a light sensor for sensing ambient light in the environment of the gateway device 102, an accelerometer, or any combination thereof.

The internal power source 118 can include a battery.

Figure 2:
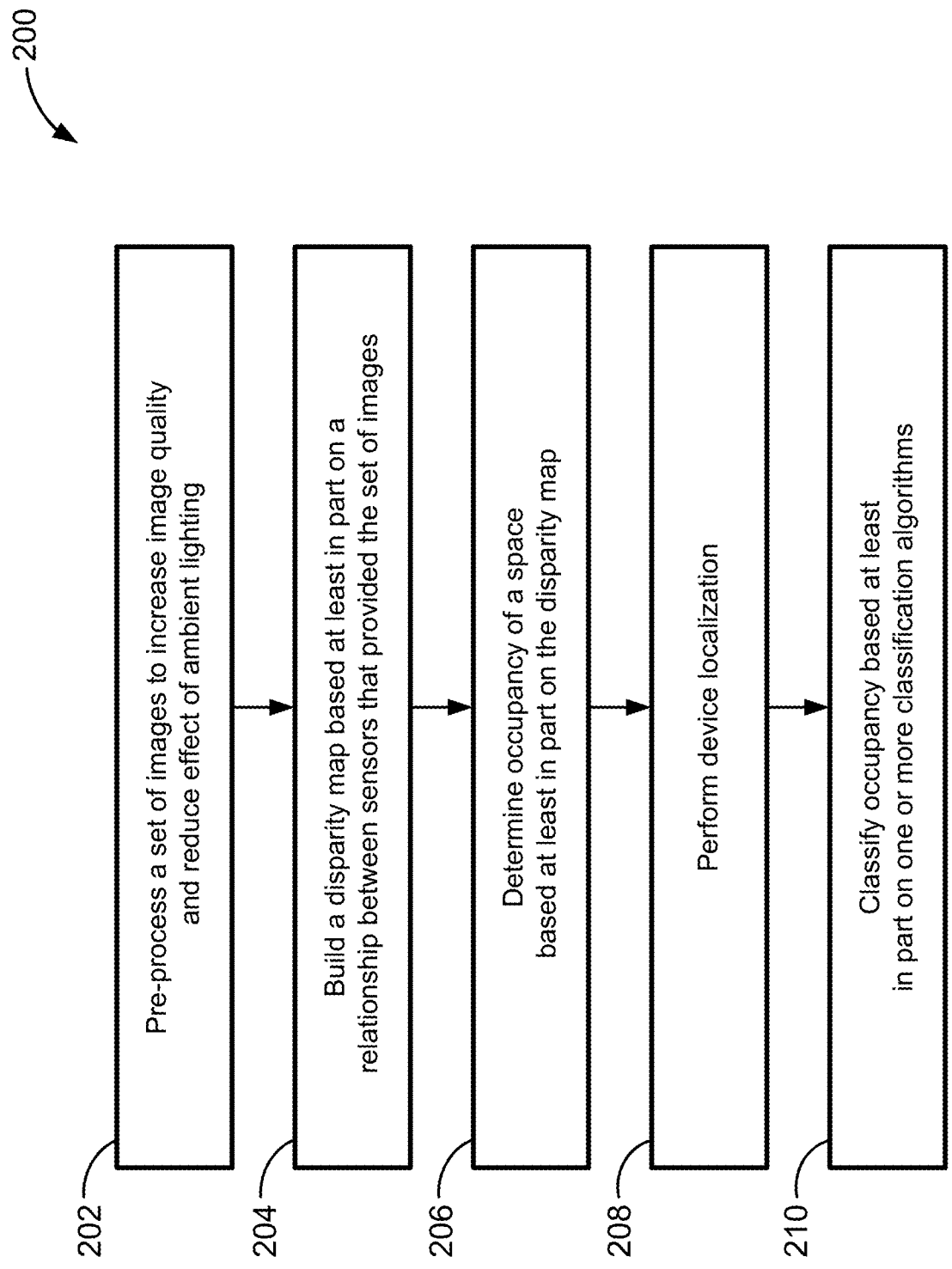
FIG. 2 is a method for determining volume using the gateway device of FIG. 1, according to certain aspects of the present disclosure.

Referring to FIG. 2, a method 200 for determining volume using the system 100 is provided, according to some implementations of the present disclosure. At step 202, the gateway device 102 and/or the computing device 104 pre-processes a set of images to increase image quality and reduces effect of ambient lighting in the set of images. A visual mapping of the cargo space is used in determining the volume of the cargo space. The internal sensor 116 of the gateway device 102 can include one or more image sensors or cameras. In some implementations, the internal sensor 116 includes two cameras that generate the set of images. The set of images can be generated by burst. That is, each camera can generate multiple images in a short timeframe (e.g., two images generated in one second, three images generated in one second, ten images generated in one second, twenty images generated in one second, etc.). Since the cameras are each generating multiple images of the same cargo space, there is a pixel relationship between each of the multiple images in the set of images. This pixel relationship is used to reduce noise by aligning the multiple images. In the case of a trailer or a container, the set of images may have been generated while the trailer or container is moving. Thus, in addition to correction for lighting conditions, effects of vibration of the container or trailer may need to be reduced as well between the multiple images. The gateway device 102 and/or the computing device 104 enhances contrast of the images representing the cargo space using the set of images obtained by the internal sensor 116. Noise reduction and contrast enhancement improves image quality, allowing to remove effect of ambient lighting condition within the cargo space for producing uniform images regardless of the lighting conditions.

At step 204, the computing device 104 and/or the gateway device 102 builds a disparity map based at least in part on a relationship between sensors (i.e., the internal sensor 116) that produced the set of images. In an example, consider two cameras in use camera 1 and camera 2. Assume camera 1 is the origin perspective and produces multiple camera 1 images, then the cargo space scene is shifted in multiple camera 2 images produced by camera 2 because there is a non-zero position (e.g., translation and/or rotation) offset for camera 2 relative to the camera 1 origin. The disparity map built at step 204 is a matrix which is the same size as each image in the set of images. The disparity map holds the pixel offset for each pixel in an image from camera 1 to the matched pixel in images from camera 2. Objects which are close to cameras 1 and 2 will have large disparity values (i.e., large pixel shifts) and objects far away will have smaller disparity values (i.e., small pixel shifts). Disparity mapping helps take perspective into consideration.

At step 206, the computing device 104 and/or the gateway device 102 determines occupancy of a space, based at least in part on the disparity map built in step 204. In some implementations, the gateway device 102 is mounted in a trailer or a container, and vibration or movement of the container can affect positioning of the internal sensor 116. Thus, in the case where the internal sensor 116 includes two cameras, yaw angle is updated to correct for any slight shifts between the two cameras. The disparity map is used to determine a depth map. The depth map is then used to determine occupancy within the cargo space.

Optionally, at step 208, the computing device 104 and/or the gateway device 102 localizes the gateway device 102. In some implementations, the gateway device 102 is installed on a door of a trailer or container, as such installation angles are taken into account. The installation angles allow maintaining localization parameters. The localization parameters can be used for multiple purposes. In some implementations, cross-correlation based corner searches for empty trailers use the localization parameters to narrowly search a small region of captured images; the small region includes at least a portion where the corner of the trailer is expected to reside. In some implementations, stereo yaw calculation and cargo estimation use the localization parameters. Stereo yaw calculation and cargo estimation use an ideal depth map, rendered from the localization parameters, to fit a cargo estimate to the disparity map of step 206. In some implementations, localization parameters are used while determining occupancy from the depth map. The volume of the ideal depth map is compared to the volume of the measured cargo depth map to determine scene fullness (i.e., occupancy).

Optionally, at step 210, the computing device 104 and/or the gateway device 102 classifies occupancy based at least in part on one or more classification algorithms. In some implementations, classifying the determined occupancy involves indicating the cargo space is full or empty. Examples of classification algorithms include saturation, stereo degradation, scene motion, scene change, corner matching, etc. In some implementations, if the cargo space is classified as being full, a human perceptible indicator (e.g., a visual or audio indicator) is provided.

Figure 3:
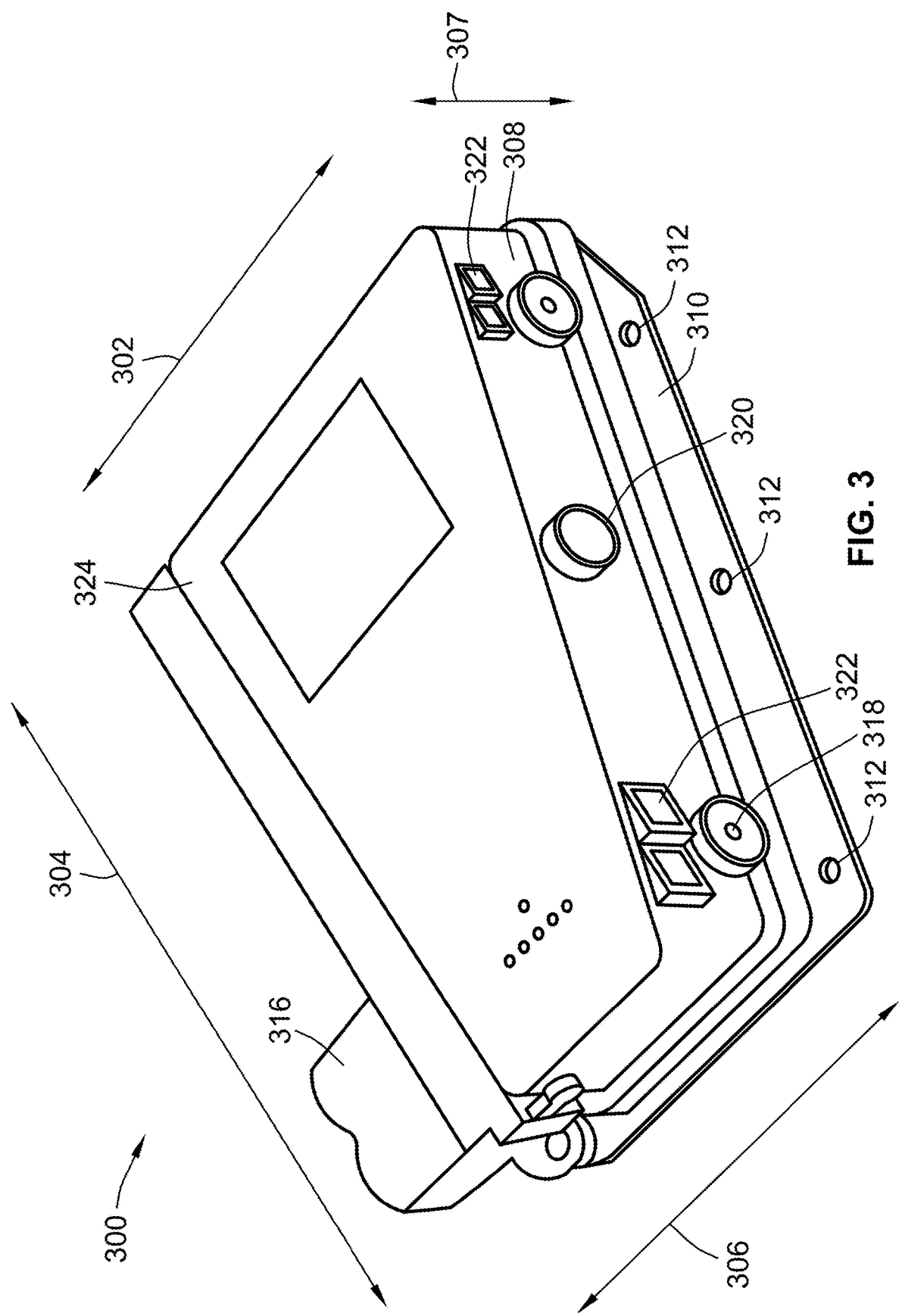
FIG. 3 illustrates an example gateway device, according to certain aspects of the present disclosure.

Referring to FIG. 3, an example gateway device 300 is provided, according to some implementations of the present disclosure. The gateway device 300 has dimensions 302, 304, 306, and 307. Dimension 302 can be about 6 inches, dimension 304 can be about 7 to 8 inches (e.g., 7.75 inches), dimension 306 can be about 4 to 5 inches (e.g., 4.75 inches), and dimension 307 can be about 1 to 2 inches (e.g., 1.75 inches). The gateway device 300 includes a housing with a top side 324 and a sidewall 308. The housing of the gateway device 300 further includes and extension 310 with holes 312 that facilitate mounting the gateway device 300 on a wall. In some implementations, the housing includes multiple parts that are put together using screws 318. The housing can further include a protruded area 316 where cables can connect to electronic components provided within the housing.

The gateway device 300 is similar to or the same as the gateway device 102 (FIG. 1). On the periphery of the housing of the gateway device 300, several components can be visible. For example, ultrasonic sensor 320 and lenses 322 are provided on sidewall 308 of the housing. In an embodiment, the ultrasonic sensor 320 is a failsafe for very full trailers. If the ultrasonic sensor 320 detects an object that is proximate to (~2 meters) the gateway device 300, then the gateway device 300 can determine that a trailer where the gateway device 300 is mounted is full. In some implementations, any occupancy level above 95% is considered full. The ultrasonic sensor 320 being used as a shortcut to calculating occupancy can augment image sensors provided in the gateway device 300 since the image sensors may have a minimum distance for capturing in-focus images for determining occupancy. In some implementations, images captured with items closer than about 5 feet do not have an acceptable disparity or depth measurement. A trailer or vessel can be loaded so full that cargo is directly in front of the gateway device 300, blocking the view of the image sensors and preventing capture of in-focus images. In an embodiment, the lenses 322 refract light from camera flash provided on the gateway device 300 to guide light from the camera flash away from the near walls.

The gateway device 300 can include near infrared (NIR) flash light emitting diodes (LEDs), LED lenses, image sensors, image sensor lenses, and lens covers. The gateway device 300 can support LTE Cat 4 (dual SIM), GPS, Bluetooth® 5, WiFi, etc. The gateway device 300 can include a dual CAN bus interface and a 1-wire bus interface. The gateway device 300 can include two 5-megapixel image sensors, a time of flight sensor, a light sensor, and an accelerometer. The gateway device can include a 15 amp-hour rechargeable battery. Furthermore, the gateway device 300 can be connected to a solar panel with power capacity of up to 14 Watts. The gateway device 300 can receive power from an external source like a vehicle in other implementations.

The gateway device 300 is used to explore certain example scenarios. The present disclosure does not limit the use of gateway devices to these specific scenarios. The scenarios are used for illustrative purposes to further explain at least the method 200 in the context of the gateway device 300 being attached to a door of a trailer. The gateway device 300 when installed should be calibrated prior to operation. Two calibrations can be performed, location calibration and stereo calibration. Location calibration is embedded in step 208 (FIG. 2), and stereo calibration is embedded in steps 202 to 206 (FIG. 2). Location calibration involves discovering pitch, roll, and yaw of the gateway device 300 installation. Stereo calibration involves maintaining a live pitch, yaw, and roll rotation of camera 2 of the gateway device 300 relative to camera 1 of the gateway device 300.

Figure 4:
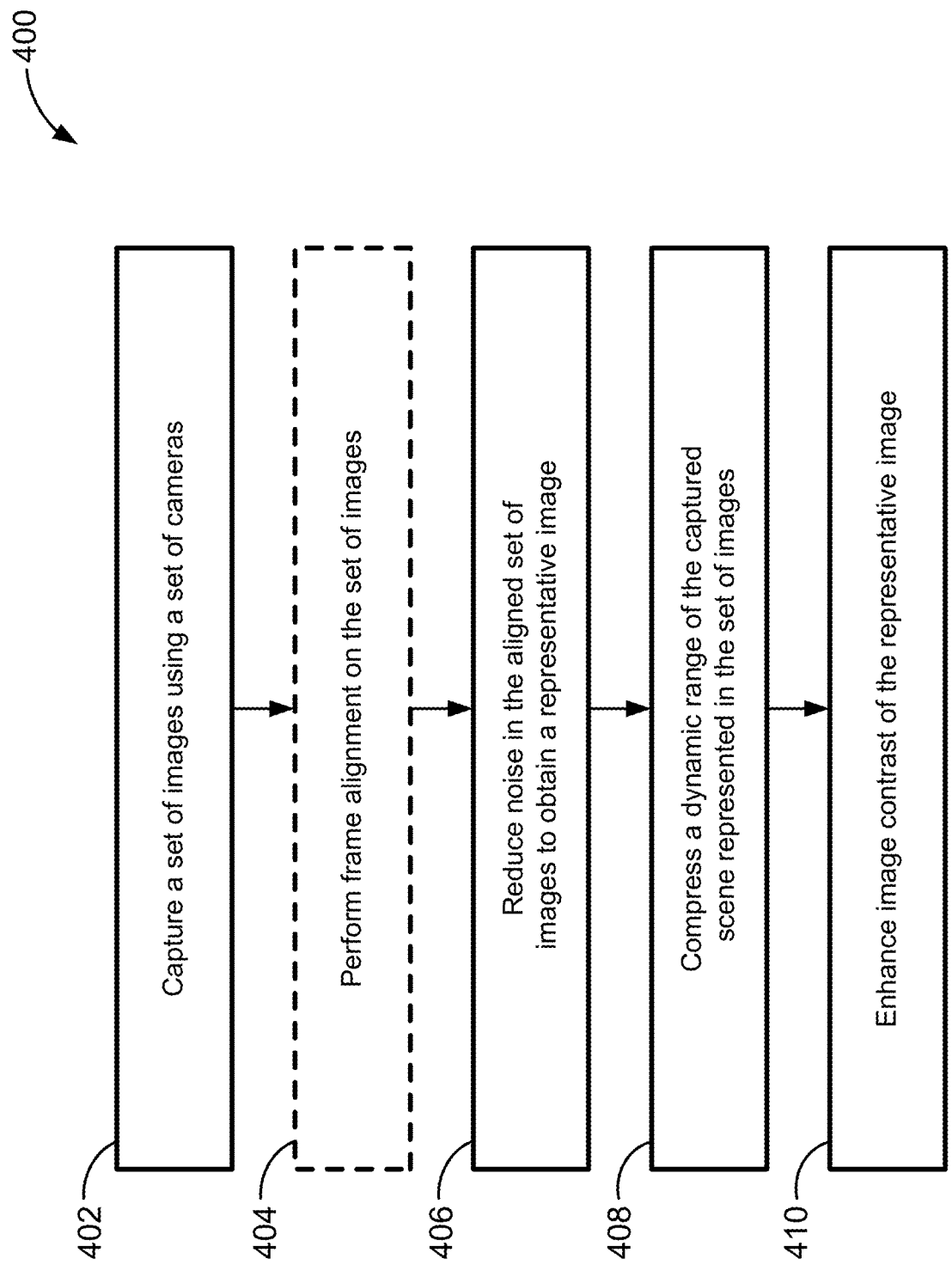
FIG. 4 is a method for pre-processing a set of images, according to certain aspects of the present disclosure.

After installation on the door of the trailer, the gateway device 300 can be used to determine real-time status of cargo space within the trailer. The gateway device 300 includes a stereo camera setup (i.e., a first camera (camera 1) and a second camera (camera 2)) to capture multiple images. Images captured by camera 1 are designated as camera 1 images and images captured by camera 2 are camera 2 images. The gateway device 300 follows the method 200 to determine occupancy of the cargo space within the trailer. At step 202, the gateway device 300 pre-processes the camera 1 images and the camera 2 images to increase image quality and reduce effect of ambient lighting. FIG. 4 is a method 400 illustrating steps for pre-processing the camera 1 and camera 2 images, according to some implementations of the present disclosure. At step 402, the gateway device 300 captures a set of images (i.e., the camera 1 images and the camera 2 images) using a set of cameras (i.e., camera 1 and camera 2). As discussed above, each of the camera 1 images and the camera 2 images can be images captured at a specific burst rate. Camera 1 and camera 2 can be low-cost cameras operating in low light environment and exposed to noise. For adequate occupancy determination, noise level in the images should be below a threshold, so the method 400 is used to reduce noise in the set of images. In some implementations, the threshold can be determined as an average standard deviation of pixel intensity at specific locations on the set of images being below a constant value of about 0.5. If the average standard deviation is below the constant value, then the noise influence between images in the set of images is determined to be acceptable. The set of images provides a set of measurement samples for each color for each pixel in the scene. The scene is defined as the interior of the trailer seen from the perspective of the gateway device 300. A simple average at each pixel can provide a single image with reduced noise.

Optionally, at step 404, the gateway device 300 performs frame alignment on the set of images. The operating environment of the gateway device 300 is not absolutely still. The sources of vibration include, but are not limited to, running engines, road vibration, wind, forklifts, and employees loading and unloading the trailer. Vibration can introduce misalignment between successive images captured in a burst. Thus, at the pixel level the captured still images of each camera (i.e., the camera 1 images or the camera 2 images) can have small perspective transforms relative to each other. Frame alignment removes faint blurriness caused by movement of the camera or the scene during successive image captures.

At step 406, the gateway device 300 can reduce noise in the aligned set of images to obtain a representative image. For example, the number of camera 1 images can be reduced from multiple images to a single image by averaging corresponding pixels in the aligned camera 1 images to obtain a representative camera 1 image. A similar process can be repeated to obtain a representative camera 2 image.

In some implementations, steps 404 and 406 are performed concurrently. For example, one or more regions of interest are identified in the camera 1 images and the camera 2 images. The regions of interest have a size that is smaller than the size of each of the camera 1 images or the camera 2 images. For example, the regions of interest can have a size of about 300 pixels by 300 pixels. A running average can be determined for successive image captures of each of the camera 1 images or the camera 2 images. The running average is a result of averaging corresponding pixels in unaligned camera 1 images (or unaligned camera 2 images). Each region of interest of an unaligned camera 1 image (or unaligned camera 2 image) is cross-correlated to corresponding regions in the running average. The cross-correlation may yield a small offset between the specific unaligned camera 1 image (or unaligned camera 2 image) and the running average. The small offset can be used to perform a perspective transform of the specific unaligned camera 1 image (or unaligned camera 2 image) before the specific unaligned camera 1 image (or unaligned camera 2 image) is incorporated into the running average. When all the unaligned images from camera 1 and camera 2 are incorporated, the running average for the camera 1 images is the representative camera 1 image, and the running average for the camera 2 images is the representative camera 2 image.

At step 408, the gateway device 300 compresses a dynamic range of the captured scene represented by the set of images. The dynamic range of the scene can be larger than the capacity of either one of camera 1 or camera 2 to capture with adequate contrast. In order to produce good image quality and contrast in all regions of the captured images and at a wider level of light variation, a pair of dynamic range compression techniques can be employed. In an example, bracketed exposure with Merten image fusion and dynamic gamma correction techniques are employed.

In an implementation, during dynamic range compression, in a first step, bracketed exposure and Merten image fusion is performed. A slightly underexposed image and a slightly overexposed image of the scene is produced by the camera 1 and the camera 2. The underexposed image captures detail in the high light regions of the scene, while the overexposed image similarly captures detail in the low light regions of the scene. Merten image fusion is advantageous in some implementations because of its performance. Furthermore, Merten image fusion does not require exposure length or other metadata be provided about the source images. Merten image fusion produces a single output image containing the best detail from both the slightly underexposed and the slightly overexposed images. After the first step, a single fused image for the camera 1 is obtained, and a single fused image for the camera 2 is obtained.

In a second step of dynamic range compression, dynamic gamma correction is applied to the single output images obtained from the Merten image fusion. A dynamically scaled gamma correction tone mapping increases the brightness and contrast in dark regions of the image while also decreasing the brightness and increasing contrast in bright regions of the image. In an example, the single fused image for the camera 1 is blurred using a normalized boxed filter, and the blurred image is used alongside the single fused image with a gamma parameter of about 0.3 to perform the gamma correction. After step 408, a gamma corrected camera 1 image and a gamma corrected camera 2 image is obtained.

At step 410, the gateway device 300 enhances image contrast of the representative image. Pixel matching between an image from camera 1 and an image from camera 2 of the same scene is performed. Camera 1 and camera 2 have different perspectives of the scene. Matching algorithms exploit features in the images, such as edges, and corners. During image contrast enhancement, a sharpening filter can be used to enhance edges and corners, and a smoothing filter can be used to reduce noise from the sharpening filter. Image processing techniques including blurring techniques, determining integral images, image blending techniques, etc., can be used in the sharpening and/or smoothing filters. In some implementations, OpenCV image library is used to implement the blurring and blending and obtaining the integral images. After step 410, the pre-processing of step 202 (FIG. 2) is completed and results in a first enhanced image from the perspective of camera 1 and a second enhanced image from the perspective of camera 2.

The gateway device 300 proceeds with step 204 (FIG. 2) to build a disparity map based at least in part on a relationship between the camera 1 and the camera 2. Camera 1 can be deemed the origin perspective of the scene, and camera 2 can be deemed the shifted perspective (i.e., shifted from the origin perspective). Camera 2 images will have a non-zero position (i.e., translation and rotation) offset relative to camera 1 images, since both cameras cannot coexist in the exact same physical location. The disparity map is a matrix the same size as the camera 1 image or the camera 2 image. Preferably camera 1 images and camera 2 images have the same dimensions. The disparity map stores pixel offset for each pixel in a camera 1 image to a matched pixel in a camera 2 image. Objects which are close to cameras 1 and 2 have large disparity values (i.e., large pixel shifts), and objects far away from cameras 1 and 2 have smaller disparity values (i.e., smaller pixel shifts).

Figure 5:
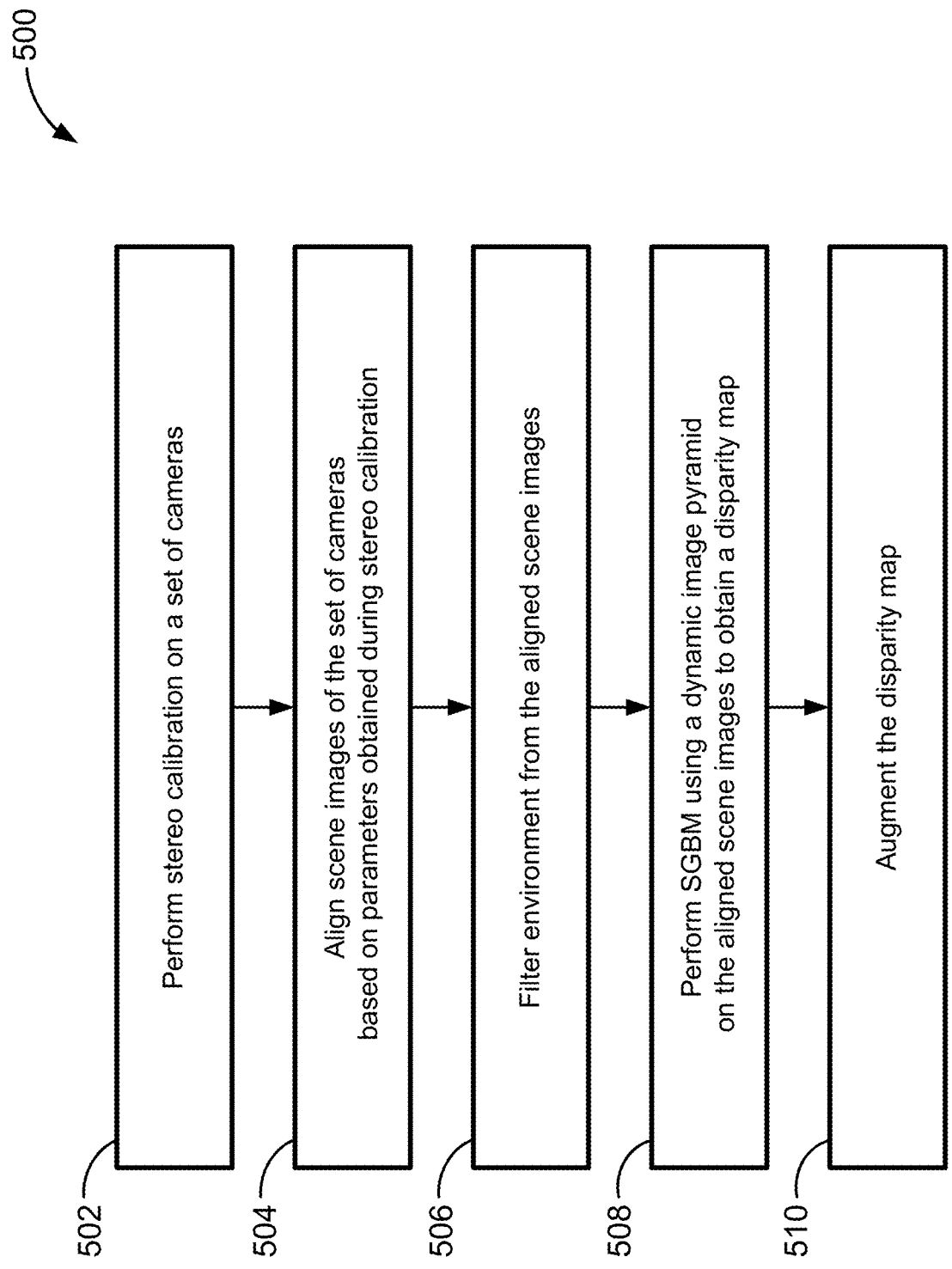
FIG. 5 is a method for building a disparity map, according to certain aspects of the present disclosure.

FIG. 5 is a method for building the disparity map, according to certain aspects of the present disclosure. Building the disparity map from camera 1 and camera 2 will benefit from stereo calibration, hence, at step 502, the gateway device 102 performs stereo calibration on the set of cameras. The purpose of stereo calibration is to find intrinsic camera parameters (e.g., focal length, optical axis, distortion, etc.) and extrinsic parameters (e.g., the translation and rotation transform between the perspectives used for image captures). In an embodiment, cameras 1 and 2 and any associated lenses used alongside cameras 1 and 2 are known, so the intrinsic camera parameters are known. Furthermore, the optical axis can be assumed to be located in the middle of a captured image. This assumption is a safe assumption when dealing with low distortion (e.g., <1% distortion). The translation between camera 1 and 2 is also assumed as a known quantity in some implementations. The translation is determined by geometry of the gateway device 300 and location of the two cameras relative to each other in the housing of the gateway device 300. The rotation can be assumed to be small angles (e.g., ranging between +0.6 degrees and −0.6 degrees) but is not known. In some implementations, the yaw can change by about 0.6 degrees in either direction, and the pitch can change by about 0.5 degrees in either direction. Minor flexing in a printed circuit board (PCB) in the gateway device 300 or flexing of the housing of the gateway device 300 can cause small angle variations between cameras 1 and 2. Traditional 'uncalibrated' stereo systems usually use image data to calibrate all unknown parameters at once. The gateway device 300 separately calibrates the pitch, yaw, and roll angles and measures these angles at different times, maintaining each angle independently.

At step 504, the gateway device 300 aligns the first enhanced image from camera 1 and the second enhanced image from camera 2 based on the pitch, yaw, and roll angles obtained during stereo calibration of step 502. Because of small pitch and roll angles between the cameras, a given row of pixels in the first enhanced image from camera 1 does not line up with the same row of pixels in the second enhanced image from camera 2. The second enhanced image undergoes a perspective transform to adjust for these angles. In an implementation, the OpenCV image library is used to determine the perspective transform. For example, the methods getPerspectiveTransform and warpPerspective can be used to obtain coordinates of the quadrangle vertices in the source and destination image.

At step 506, the gateway device 300 filters static environment from the aligned image. For example, the gateway device 300 is mounted to the trailer door and operates in a consistent trailer environment. The door that the gateway device 300 is mounted to and the ceiling do not stereo match well. As such, pixels from these regions of the image are omitted from calibration and occupancy algorithms. The pixels from these regions can be set to zero or can be set to 255 in RGB format.

At step 508, the gateway device 300 performs semi-global block matching (SGBM) using a dynamic image pyramid. Since the gateway device 300 is installed in a consistent location (e.g., at an upper left corner by the door of the trailer), only a small portion of the field of view includes the far wall (i.e., the "nose") of the trailer. The majority of the scene captured by the first and second enhanced images is of the trailer walls or floors, which means each pixel in a captured image has a maximum distance determined by the distance to the wall, floor or nose from the gateway device 300. Since only a small portion of each of the first and second enhanced images has the possibility of a full maximum distance (i.e., the nose), the majority of the scene does not need the maximum possible depth resolution. In order to produce more consistent SGBM results using less processing time, the dynamic image pyramid is used. Different regions of the first and second enhanced image use different binned or scaled versions of the respective image. Only the small region around the nose uses the full image resolution. As the maximum possible depth decreases, the resolution used for block matching decreases.

For example, SGBM provides a matrix (i.e., the disparity map) and a confidence matrix surrounding values within that matrix. Given a first sample image and a second sample image, the disparity map between these two images will describe a shift or transformation that should be performed to obtain the first image from the second image. Since closer objects will exhibit larger shifts compared to farther objects, the gateway device 300 divides the two images into regions of interest based on object depth within the image. Given that the cameras that obtained the first and second images will provide images with a perspective, and given that these cameras are mounted in a trailer, the nose of the trailer can be used as the farthest location within the trailer and can be used as the spot with the lowest angular shift between the first image and the second image. The dynamic image pyramid method involves splitting up the images into different regions of interest based on object depth within the images.

The regions of interest will have a telescopic effect spanning out from the nose of the trailer. Each region of interest includes objects at specified depths. For example, a first region of interest includes objects between 45 feet and 50 feet, a second region of interest includes objects between 40 and 45 feet, a third region of interest includes objects between 35 and 40 feet, etc. As more regions of interest are added, the shift in the region of interests between the first image and the second image increases. So if the first region of interest has minimal shift between the first image and the second image, then the third region of interest will have a larger shift between the first image and the second image. Discrete depth steps are used for the regions of interest, and in some implementations, a depth of 5 feet is the closest depth considered, since computation speed of determining the disparity map has an inverse cubed relationship with the depth. In some implementations, there are 8 depth bands from the nose of the trailer to the minimum distance of interest from the camera (e.g., a depth of 5 feet).

Furthermore, in some implementations, to reduce computational burden, the resolution of the different regions of interest can be scaled based on depth. For example, the first region of interest with the minimal shift can use full resolution while the second region can use a reduced resolution (e.g., half resolution of the first region of interest), and the third region can use an even more reduced resolution (e.g., a third resolution of the first region of interest), etc. In some implementations, the depth. For each of the regions of interest, SGBM is performed to receive regional disparity maps and confidence scores associated with each of the pixels of the regional disparity maps. The regional disparity maps are stitched together to obtain the disparity map.

Since the regional disparity maps may be of different resolutions due to the resolution scaling described above, prior to stitching these disparity maps together, a resolution correction step is performed to resize the maps to match resolution of the first region of interest that used the full resolution. Furthermore, due to the telescopic effect there is some overlap between the different regional disparity maps. Thus, the maps are stitched one after another, such that if a value is already populated within the disparity map, that map is not overridden by a later regional disparity map being stitched. A similar stitching is performed with the confidence scores obtained for each of the regional disparity map, such that confidence scores (or measurements) are maintained for each of the values in the disparity map.

In some implementations, SGBM does not provide a reliable confident measurement at every pixel, for example, the stitching of the regional disparity maps can cause discontinuities or areas of uncertainty. In some cases, about 20% to 30% of pixels can have a low confidence. To increase the number of confident disparity measurements, a cross-correlation technique can be used as a supplement to SGBM at step 510. In some implementations, cross-correlation techniques included in OpenCV can be used. These can include the TM_CCOEFF and/or the TM_CCORR algorithms. The enhanced images from step 506 (i.e., images from camera 1 and camera 2 where the static environment has been filtered) are compared row by row using the cross-correlation techniques to find the areas with highest matching between the enhanced images. The result of the row by row comparison is a matrix with associated confidence associated with the matrix. The disparity map obtained by SGBM is then combined with the obtained matrix. In some implementations, a weighted average is performed where the SGBM disparity map is weighted more heavily compared to the obtained matrix. The result of the weighted average is taken as the disparity map of step 204. Once the disparity map is completed at step 510, step 204 is completed.

The gateway device 300, at step 206, determines occupancy of the trailer using the disparity map. The gateway device 300 determines yaw angle between camera 1 and camera 2. Typically, without a reference object of known size in the image, calibrating yaw angle is impossible. For this reason, stereo systems are often calibrated once, and only a full calibrated system can be used effectively. A gateway device mounted in a shipping vessel cannot afford a once-only calibration. Temperature changes and vibration can quickly degrade any static calibration, which can prevent the gateway device 300 from working accurately. As such, yaw angle is continuously calibrated from only field data (i.e., images of inside of the trailer). The stereo pitch and roll are also continuously calibrated from field data for the same reasons.

Figure 6:
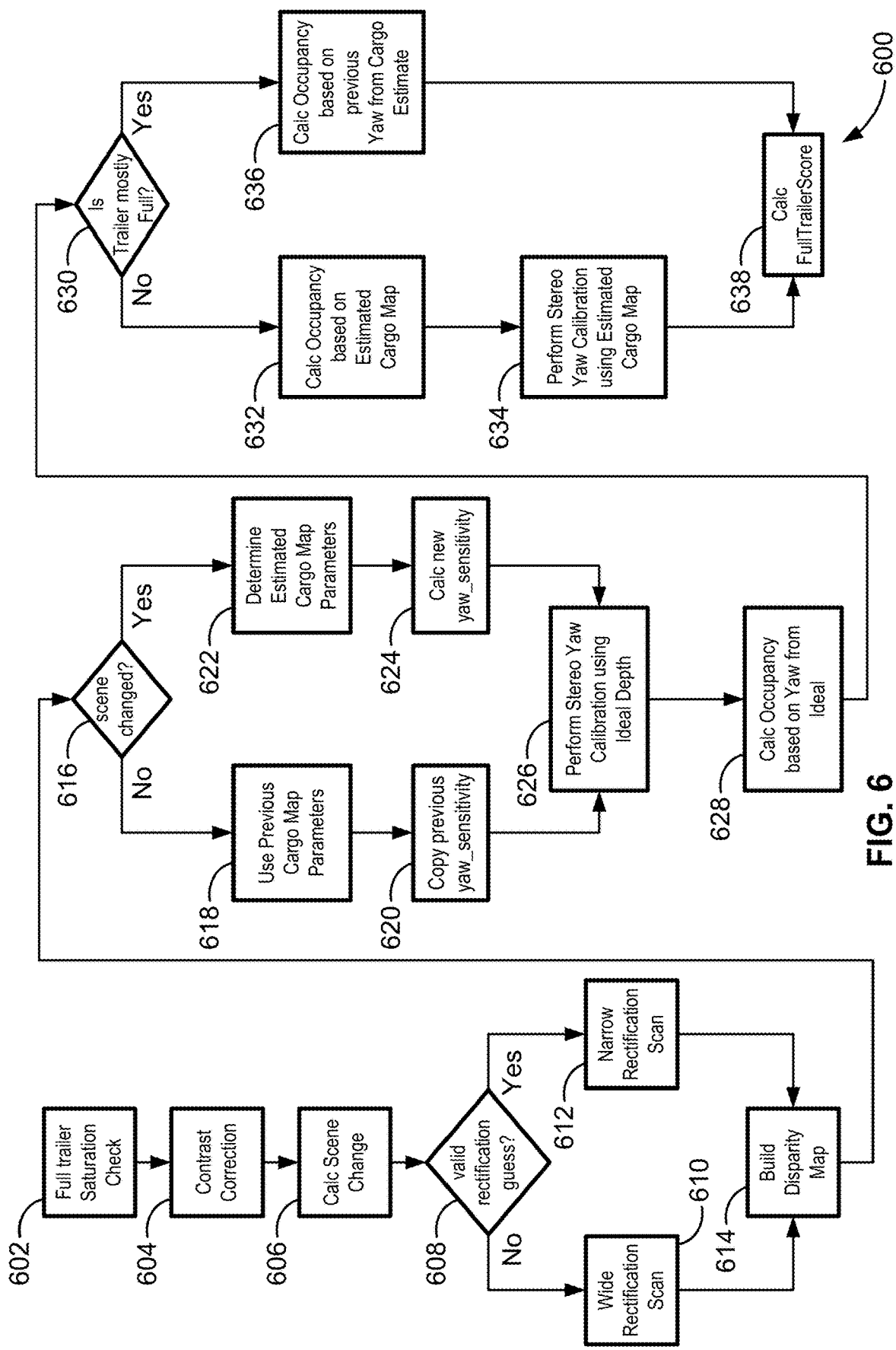
FIG. 6 is a method for determining occupancy, according to certain aspects of the present disclosure.

FIG. 6 is a flow diagram illustrating a method 600 for determining occupancy, according to some implementations of the present disclosure. The method 600 incorporates some of steps 206, 208, and 210. At step 206, the gateway device 300 determines whether the trailer is full, based on saturation levels in the output images for each camera obtained at step 202 (FIG. 2). In some implementations, the number of saturated pixels can be counted. If the number of saturated pixels in the image is above a saturation pixel threshold, then the trailer is determined to be full. In some implementations, the saturation pixel threshold is about 10% of all the pixels in the image, about 20% of all the pixels in the image, about 30% of all the pixels in the image, etc.

In some implementations, at step 604, the gateway device 300 captures a scene image and corrects contrast on the scene image. At step 606, the gateway device 300 calculates whether the scene image has changed when compared to the output images obtained at step 202 (FIG. 2). The contrast correction can be similar to contrast correction as described above in connection with step 410 (FIG. 4).

At step 606, the gateway device 300 determines whether the scene has changed based on the contrast corrected image of step 606. The gateway device 300 can determine a change score based at least in part on a previous image used to obtain a previous occupancy score. The previous image and the contrast corrected image of step 606 can be compared to determine whether a difference between the images exceeds a score threshold. In some implementations, a Gaussian blurring is performed on the images to reduce noise associated with sharpening or enhanced contrasts in the images. If the score threshold is exceeded, then the gateway device 300 determines that the scene has changed, but if the score threshold is not exceeded then the gateway device 300 determines that the scene has not changed.

At steps 608 to 614, the gateway device 300 determines whether to update the disparity map (from step 204 of FIG. 2). At step 608, the gateway device 300 determines whether the localization parameters related to pitch are acceptable, and if the pitch is not acceptable, then a wide rectification scan is performed at step 610, and if the pitch is acceptable, then a narrow rectification scan is performed at step 612. At step 608, the gateway device 300 provides a pitch guess, which can be a default pitch value or can be a value of the pitch from a last time occupancy was determined. Occupancy determination usually provides a pitch and a confidence associated with the pitch, thus, if the confidence associated with the pitch is above a confidence threshold, then the pitch is acceptable. If the confidence is not above the threshold, then the pitch is not acceptable. The wide rectification scan at step 610 can involve a pixel width scan of about −200 pixels to +200 pixels while a narrow rectification scan at step 612 can involve a pixel width scan of about −3 pixels to +3 pixels. In some implementations, once occupancy has been determined, then the pitch angle between camera 1 and camera 2 should not change drastically, thus a narrow rectification scan (rather than the wide rectification scan) is performed most of the time for the purpose of making minor corrections. Although quoted above in pixels, the wide and narrow rectification scans are used to determine a new pitch value (i.e. an angle). A wide rectification scan is a more expensive search than a narrow rectification scan.

The narrow rectification scan and the wide rectification scan to determine the pitch involves determining a Harris map for the enhanced images of step 506. The Harris map is a matrix that provides scores for corners and lines. Considering that the container or trailer where the gateway device 300 is mounted has a corner and defined lines along the wall, and may have items or boxes inside with defined edges, the Harris maps highlights features in the first and second enhanced images. Harris maps are used here as an example, but any method that can highlight edges and corners can be used. Both the Harris map for the first image and the Harris map for the second image are each compressed down to one dimensional vectors. In some implementations, the rows of the first Harris map are all added together to obtain the first one dimensional vector, and the rows of the second Harris map are all added together to obtain the second one dimensional vector. The first one dimensional vector is compared to the second one dimensional vector to determine whether the two vectors are aligned. In some implementations, this involves subtracting one vector from the other and obtaining a difference vector. Each element of the difference vector can be absolute valued and then added to determine whether the sum of the elements is zero. The pitch search involves searching different pitch values to minimize the sum of the difference vector. Different pitch values result in a rotation of one of the Harris maps, thus each of the different pitch values can result in a different difference vector. The pitch search is limited, thus, after a certain amount of tries, the pitch that provided the difference vector with the minimum sum of elements is chosen. At step 614, the disparity map is updated based on either one of the wide or narrow rectification scans after the new pitch value is obtained.

At step 616, based at least in part on the scene not changing (i.e., based on results from step 606), previous cargo map parameters are used in step 618 with previous yaw sensitivity parameters used in step 620. If the scene has changed, then cargo map parameters are estimated in step 622, and yaw sensitivity parameters are estimated in step 624. Cargo map parameters are part of the depth map. In some implementations, cargo map parameters include cargo depth, cargo depth fitness, and cargo floor. Cargo depth fitness is a confidence score associated with the cargo depth.

At step 626, the gateway device 300 performs stereo yaw calibration using ideal depth. The ideal depth is a depth map of an empty trailer. The empty trailer is rendered, with default yaw angles from when the gateway device 300 was first installed on the trailer. In some implementations, the default pitch is 0.315 radians, default yaw is 0.35 radians, and roll is 0 radians. The ideal depth is determined as a baseline comparison. The yaw angle between the cameras causes a fixed offset in the disparity map. The yaw angle can be determined by converting the depth reference into a disparity reference and subtracting it off of the measured disparity map. The mode in the difference map can provide the yaw angle, with the mode being found using kernel density estimation. The mode is used because the yaw will have a constant offset on the disparity map. If the yaw does not present about a constant offset, then this indicates less confidence in the yaw value.

At step 628, the gateway device 300 determines occupancy based on yaw from the ideal depth. At steps 630 to 636, different algorithms are used for determining occupancy of the trailer based on whether the trailer is mostly full (i.e., result from step 602). At steps 632 and 634, if the trailer is not full, a cargo search is performed. Cargo is estimated in the scene and a new stereo yaw estimate is calculated at the same time. In some implementations, the cargo estimation involves determining a shape of the cargo starting from the nose of the trailer. The shape of the cargo can be assumed to be a rectangular prism, thus cargo estimation involves determining the height, width, and length of the prism. The stereo yaw calibration described above in connection with step 626 can be used to estimate stereo yaw. The optimization at steps 632 and 634 where cargo map and stereo yaw are calibrated at the same time can be used to calculate occupancy. At step 636, if the trailer is full, then occupancy is calculated based on previous yaw from cargo estimate. Occupancy can be determined as a difference between a reference volume and a composite volume, where the reference volume is related to the ideal map and the composite volume is related to the yaw cargo estimate.

At step 638, the full trailer score is calculated. In some implementations, the full trailer score is merely an indication of whether the trailer is full. Based on the occupancy determined at steps 632 or 636 being above a threshold, the gateway device 300 can determine that the full trailer score is a 1, otherwise, the full trailer score is determined to be a 0.

Classification algorithms can be used to assist occupancy calculations. Depth estimation by stereo cameras has a minimum detection distance. If an object is too close to the gateway device 300, the gateway device 300 may not be able to determine an accurate depth estimate. In some implementations, classification methods can be used to determine whether the trailer or vessel is "full." Full in this context is described as maximum load capacity of the trailer. The classification methods can address full vessels where items may be stacked in front of the gateway device 300, thereby impacting stereo based depth estimation.

In some implementations, the vessel can be found to be full based on saturation. The gateway device 300 can use infrared LED flash when capturing images. The infrared LED flash can be set to provide adequate light in an empty vessel where no other light is available. When the vessel is full and cargo is stacked in front of the device the flash reflects off a much closer surface to the gateway device 300 when compared to a situation of an empty vessel. This close reflection causes many pixels in the center of the image to saturate white. If the gateway device 300 detects a threshold of saturated pixels, then the vessel is determined to be full, and thus classified as such.

In some implementations, when the vessel is full and objects in scene are closer than the minimum depth estimation distance, the stereo cameras provide low quality image data. The gateway device 300 can measure the data quality using a confidence score. As the vessel begins to fill up and objects are placed closer and closer to the gateway device 300, the gateway device 300 determines higher and higher occupancy estimates (for the pixels that can contribute to the estimation). As the occupancy estimates rise, the confidence score is decreased. The gateway device 300 can facilitate calculating a vessel full score by dividing occupancy estimates by the confidence score. If the vessel full score is above a full threshold, then the gateway device 300 can determine the vessel as being full, thus classifying the vessel as full.

In some implementations, a cross-correlation algorithm is used to determine whether the vessel is empty. One factor that can impact reporting accuracy of the gateway device 300 is an empty vessel. From a small sample image, determining whether the vessel is empty is trivial to a human, but in computer vision, it is advantageous that the gateway device 300 does not over report (e.g., indicating an occupancy of 10% or 20% when the vessel is empty). Unfortunately, depth accuracy for stereo systems is worse at longer distances. An empty vessel presents the longest distances measured by the gateway device 300 because the gateway device 300 is measuring distance to the walls everywhere in the image. In order to increase accuracy when the vessel is empty, the gateway device 300 includes an additional algorithm for classification when the vessel is empty. The gateway device 300 uses a set of 'templates' of the back opposite corner of the vessel. A cross-correlation search compares the expected location of the back opposite corner of the vessel against the known set of templates. If a good match is found, then the gateway device 300 determines that the back opposite corner of the vessel is in view. If that corner is in view the gateway device 300 labels the scene as empty, and the gateway device 300 reports that the vessel is empty. In some implementations, the gateway device 300 determines that the vessel is empty whenever the back opposite corner of the vessel is in view. This assumption can reduce computation and can apply in most situations. Vessels are typically loaded from the back forward in order to maximize space and to secure loads. It is very unlikely a single pallet is left in the middle of a vessel for shipment.

In some implementations, the gateway device 300 operates on a still scene assumption. That is, in order for the stereo camera system (e.g., camera 1 and camera 2) to operate properly, both cameras take images of the same scene. Moving objects in the scene can disrupt obtaining images of the same scene. For example, feature matching between camera 1 and camera 2 will not work if an object moves between image captures, and objects in motion cause motion blur thus impacting captured image quality. In order to reduce effects of motion and reduce any errors associated with the still scene assumption, the gateway device 300 can capture a quick single image before commencing a time-consuming high fidelity image capture process. The gateway device 300 can then capture a second single image after the image capture process is completed. A background subtraction algorithm compares the two images to determine if anything changed between the before and after image. If there is sufficient change, then the gateway device 300 labels the captured images as 'scene motion'.

The gateway device 300 should report the same, or very similar data, if the contents of the vessel do not change. Depending on the reporting schedule, the gateway device 300 may perform several measurements on the same cargo. The gateway device 300 can include determine whether a current scene being captured is the same as a previously measured scene. If the current scene is the same as the previously measured scene, then the gateway device 300 can report the same data to ensure consistency. Furthermore, in reusing data associated with the previously measured scene, the gateway device 300 can reduce processing requirements and conserve power. To make this determination, the gateway device 300 saves the image from camera 1 to disk as a 'previous image'. Then on the next measurement the new image from camera 1 and the previous image are compared using a background subtraction algorithm. If very little content changed between the compared images, then the scene is labeled as 'no change' and the gateway device 300 can report previously measured data.

Figure 7:
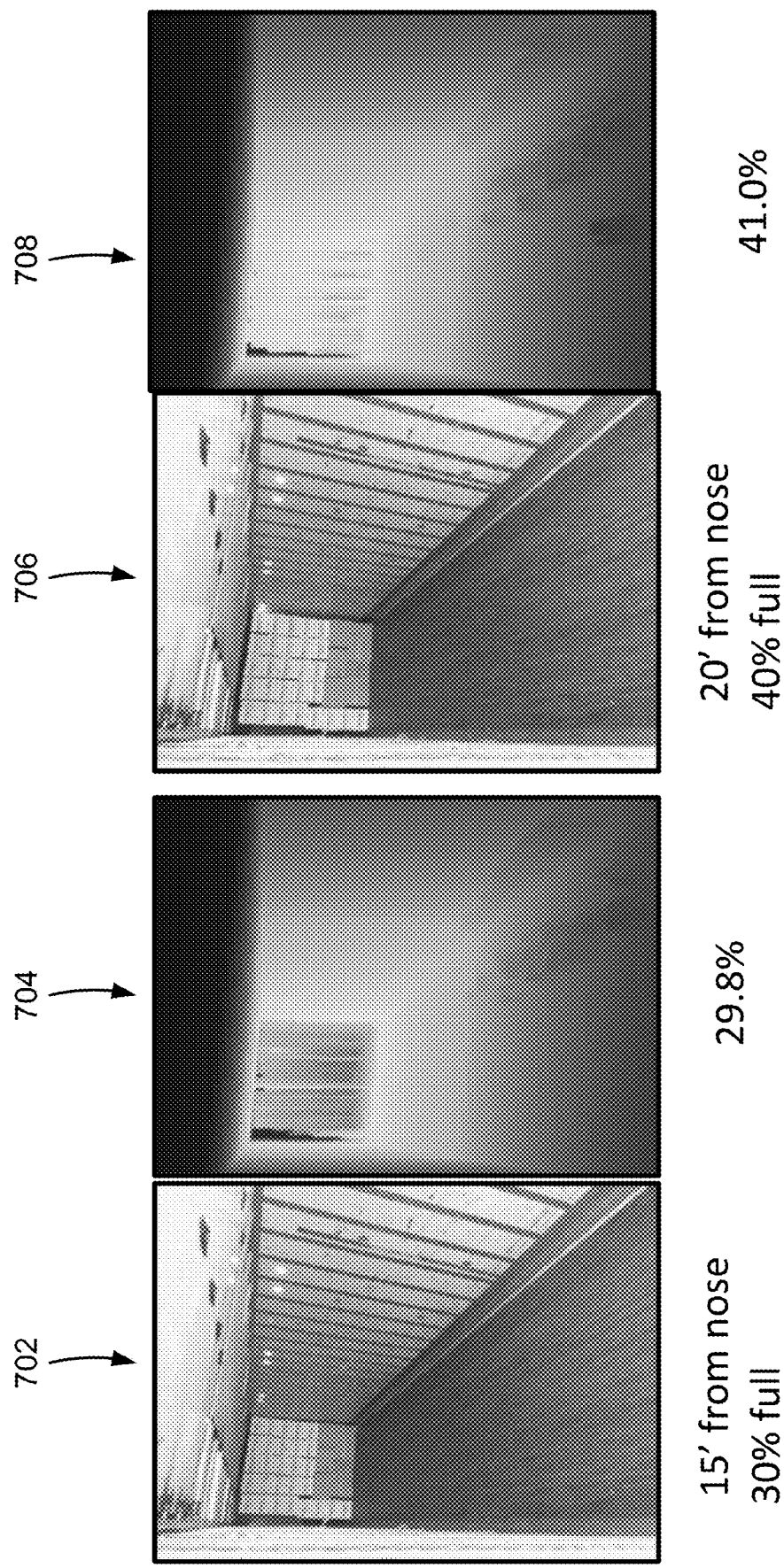
FIG. 7 illustrates first example results, according to certain aspects of the present disclosure.
Figure 8:
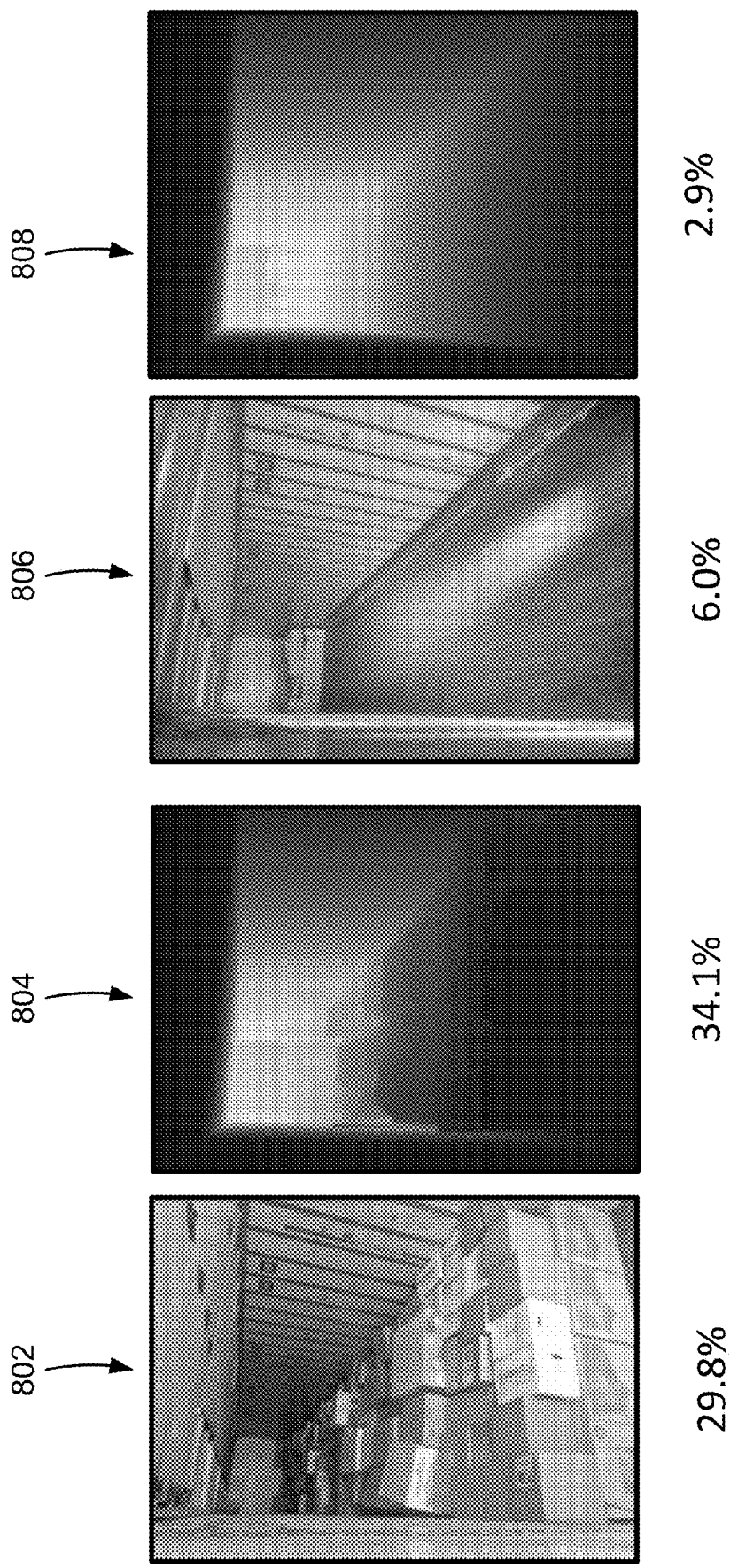
FIG. 8 illustrates second example results, according to certain aspects of the present disclosure.

FIGS. 7 and 8 illustrate example results for determining occupancy according to some implementations of the present disclosure. Referring to FIG. 7, a photo 702 captured by a camera of a gateway device (e.g., the gateway device 300) is provided. The photo 702 shows the inside of a trailer loaded with items such that the trailer is 30% full. Enhanced image 704 is provided corresponding to the photo 702. The enhanced image 702 is a result of processing by the gateway device and used to determine that the trailer is 29.8% full. There is agreement between the photo 702, the enhanced image 704, and the calculated occupancy of about 30%. A photo 706 and an enhanced image 708 are provided as well as another example result to show agreement between determined occupancy of about 40%.

Referring to FIG. 8, more results are provided. A photo 802 and a corresponding enhanced image 804 and a photo 806 and a corresponding enhanced image 808 both provide some agreement in occupancy. In the photo 802 and 806, the trailer is partially filled such that the items are not stacked all the way to the ceiling of the trailer. The 29.8% and 34.1% disparity between the photo 802 and the enhanced image 804 can be attributed to this style of loading the trailer. Even with partially filling the trailer, there is agreement in occupancy. The 6.0% and 2.9% disparity between the photo 806 and the enhanced image 808 have a similar issue.

Embodiments of the disclosure provide several advantages which include provision of real-time, event driven and historical views of trailer or container status. That is, cargo space of a trailer can be indicated as empty or full, and a remote manager can remotely monitor status of cargo spaces for a fleet of trailers or containers. As items are being removed or added to cargo spaces, the status of the cargo spaces can be communicated using one of many network interfaces provided on a gateway device. Lighting conditions are not an issue, and status can be provided in any lighting condition. Furthermore, images used to determine status of the cargo space can be provided to the remote manager for manual confirmation.

Embodiments of the present disclosure provide a gateway device that performs location calibration and stereo calibration. These two calibration steps ease installation requirements when installing the gateway device to a trailer. As such, the position of install can be less precise, and any shifts in camera angles can be automatically corrected for over time. The gateway device is installed on a moving object, as such, even small changes in camera angle due to vibrations can distort results provided using the gateway device. In location calibration, even though gateway devices are installed in a consistent way, there are small angle differences between each install. Each installed gateway device thus discovers its unique location within the trailer. Once the gateway device has that unique location it can save that location in memory. The install location is not changed once installed, however, upon install the gateway device performs an initial discovery of its location. The gateway device will start from a default install location, then learn its unique location from empty trailer images. The gateway device is able to determine when it has calculated a better solution and adopt it, allowing this calibration to be fully automated.

In stereo calibration, there are always small angle differences between the cameras in the gateway devices. These small angles do not remain consistent and continuously change slightly over time. Stereo calibration allows measuring distances using a stereo camera pair. Many short-range stereo devices will perform this calibration once at the factory then use those values forever. Embodiments of the present disclosure cannot rely on such one-shot calibration since some trailers that use the gateway device for measuring occupancy can have a depth of 53 feet. The long distances make a stereo camera more sensitive to calibration defects. A gateway device which is calibrated once and is then released would be ineffective in handling such depth. Embodiments of the present disclosure provide stereo calibration using only images of the trailer obtained with the gateway device. On every occupancy determination, the gateway device can update some or all of its stereo calibration in order to remain calibrated. This stereo calibration enables using low-cost camera devices instead of much more expensive LIDAR or structured light solutions.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A system comprising:
    a sensor including a set of cameras configured to capture a set of images of an enclosed space;
    a processor; and
    a non-transitory computer-readable medium containing instructions which, when executed on the processor, cause the processor to perform operations including:
        receiving the set of images captured by the set of cameras;
        receiving an ideal depth of the enclosed space;
        pre-processing the set of images to improve quality;
        building a disparity map for the set of images based at least in part on a relationship between the set of cameras;
        determining a depth map based on the disparity map; and
        determining an occupancy or an available volume of the enclosed space based at least in part on a comparison between the determined depth map and the ideal depth map.

2. The system of claim 1, wherein pre-processing the set of images includes:
    frame aligning the set of images.

3. The system of claim 1, wherein pre-processing the set of images includes:
    performing noise reduction on the set of images to obtain a representative image;
    compressing a dynamic range of the captured scene represented in the set of images; and
    enhancing image contrast of the representative image.

4. The system of claim 3, wherein noise reduction and frame alignment are performed concurrently, the noise reduction including determining a running average of pixels in the set of images and the frame alignment including aligning pixels of a first image in the set of images prior to including the first image in the running average.

5. The system of claim 3, wherein compressing the dynamic range of the captured scene includes:
    capturing an overexposed image and an underexposed image and obtaining a fused image using Merten image fusion on the overexposed image and the underexposed image; and
    performing dynamic gamma correction on the fused image.

6. The system of claim 1, wherein pre-processing the set of images includes determining that the set of images have an acceptable noise level, wherein the determination comprises: calculating an average standard deviation of pixel intensity at specific location on the set of images and determining that the standard deviation is below a noise threshold.

7. The system of claim 1, wherein the set of images includes burst images sampled at a frequency of at least two images per second.

8. The system of claim 1, wherein building the disparity map comprises:
    calibrating the set of cameras to obtain pitch, yaw, and roll angles associated with the set of cameras;
    aligning enhanced images associated with the set of cameras based on the pitch, yaw, and roll angles;
    filtering static environment regions from each of the enhanced images; and
    performing semi-global block matching using a dynamic image pyramid to obtain the disparity map.

9. The system of claim 1, wherein executing the instructions on the processor further causes the processor to perform the operations including:
    localizing the set of cameras; and
    classifying the occupancy or the available volume of the enclosed space based at least in part on one or more classification algorithms.

10. The system of claim 1, wherein the one or more classification algorithms includes saturation, stereo degradation, scene motion, scene change, corner matching, or any combination thereof, and wherein saturation includes determining a percentage of pixels in a representative image of the set of images that are saturated, and based on the percentage being above a saturation threshold, classifying the occupancy or available volume of the enclosed space as full.

11. The system of claim 10, wherein the saturation threshold is 20 percent.

12. The system of claim 10, wherein scene motion includes:
    blurring a current scene captured image and a previous scene captured image;
    determining, from the blurred current scene captured image and the blurred previous scene captured image, whether a scene depicting the enclosed space has changed; and
    based on the scene changing, updating the disparity map.

13. The system of claim 1, wherein the sensor further includes a time of flight sensor, a light sensor, an accelerometer, or any combination thereof.

14. The system of claim 1, wherein the set of cameras consists of two cameras.

15. A method for determining cargo occupancy or available volume comprising:
receiving a set of images of an enclosed space captured by a set of cameras;
receiving an ideal depth of the enclosed space;
pre-processing the set of images to improve quality;
building a disparity map for the set of images based at least in part on a relationship between the set of cameras;
determining a depth map based on the disparity map; and
determining an occupancy or available volume of the enclosed space based at least in part on the a comparison between the determined depth map and the ideal depth.

16. The method of claim 15, wherein pre-processing the set of images includes:
performing noise reduction on the set of images to obtain a representative image,
compressing a dynamic range of the captured scene represented in the set of images; and
enhancing image contrast of the representative image.

17. The method of claim 16, wherein noise reduction and frame alignment are performed concurrently, the noise reduction including determining a running average of pixels in the set of images and the frame alignment including aligning pixels of a first image in the set of images prior to including the first image in the running average.

18. The method of claim 15, further comprising:
localizing the set of cameras; and
classifying the occupancy or available volume of the enclosed space based at least in part on one or more classification algorithms, wherein the one or more classification algorithms includes saturation, stereo degradation, scene motion, scene change, corner matching, or any combination thereof.

19. The system of claim 1, in combination with a trailer or a container or vessel configured to hold cargo, the sensor being mounted in the trailer or in the container or vessel, or on a door thereof.

20. The method of claim 15, wherein the set of cameras is mounted in a trailer or a container or vessel configured to hold cargo.

* * * * *